US012663677B2

(12) United States Patent
Yamada et al.

(10) Patent No.: US 12,663,677 B2
(45) Date of Patent: *Jun. 23, 2026

(54) DIMMING LAMINATE AND RESIN SPACER FOR DIMMING LAMINATE

(71) Applicant: SEKISUI CHEMICAL CO., LTD., Osaka (JP)

(72) Inventors: Yasuyuki Yamada, Shiga (JP); Hideyuki Takahashi, Shiga (JP); Saori Ueda, Shiga (JP); Minoru Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/767,195

(22) Filed: Jul. 9, 2024

(65) Prior Publication Data

US 2024/0361639 A1    Oct. 31, 2024

Related U.S. Application Data

(63) Continuation of application No. 18/129,458, filed on Mar. 31, 2023, now Pat. No. 12,072,583, which is a
(Continued)

(30) Foreign Application Priority Data

Jan. 17, 2018    (JP) ................................. 2018-005684

(51) Int. Cl.
*G02F 1/1339* (2006.01)
*B32B 5/16* (2006.01)
(Continued)

(52) U.S. Cl.
CPC .............. *G02F 1/1339* (2013.01); *B32B 5/16* (2013.01); *B32B 17/10036* (2013.01);
(Continued)

(58) Field of Classification Search
None
See application file for complete search history.

(56) References Cited

U.S. PATENT DOCUMENTS 5,486,941 A    1/1996 Saiuchi et al.
6,190,774 B1    2/2001 Tanaka et al.
(Continued)

FOREIGN PATENT DOCUMENTS

CN    1210597    3/1999
CN    1253305    5/2000
(Continued)

OTHER PUBLICATIONS

Office Action issued Nov. 7, 2024 in corresponding European Patent Application No. 19741576.3.
(Continued)

*Primary Examiner* — Richard H Kim
(74) *Attorney, Agent, or Firm* — Wenderoth, Lind & Ponack, L.L.P.

(57) ABSTRACT

Provided is a dimming laminate which can effectively suppress occurrence of color unevenness and light omission. The dimming laminate according to the present invention includes a first transparent base material, a second transparent base material, and a dimming layer disposed between the first transparent base material and the second transparent base material. In this dimming laminate, the dimming layer includes a resin spacer, the resin spacer is a plurality of resin particles, and the resin spacer does not contain resin particles having a particle diameter of 1.4 times or more an average particle diameter of the resin particles or contains 0.0006% or less of the resin particles having a particle diameter of 1.4 times or more the average particle diameter of the resin particles, relative to 100% of the whole number of the resin particles.

7 Claims, 1 Drawing Sheet

Related U.S. Application Data continuation of application No. 16/962,019, filed as application No. PCT/JP2019/000495 on Jan. 10, 2019, now Pat. No. 11,644,717.

(51) Int. Cl.
    *B32B 17/10*      (2006.01)
    *B32B 27/20*      (2006.01)

(52) U.S. Cl.
    CPC .......... *B32B 27/20* (2013.01); *B32B 2264/02* (2013.01); *B32B 2307/40* (2013.01); *B32B 2457/202* (2013.01); *G02F 1/13398* (2021.01)

(56) References Cited

U.S. PATENT DOCUMENTS

| | | | |
|---|---|---|---|
| 11,644,717 B2 | 5/2023 | Yamada | |
| 12,072,583 B2 * | 8/2024 | Yamada | .......... B32B 17/10036 |
| 2002/0012757 A1 | 1/2002 | Tanaka et al. | |
| 2003/0043333 A1 | 3/2003 | Miyazaki | |
| 2006/0229376 A1 | 10/2006 | Hayashi et al. | |
| 2007/0252112 A1 | 11/2007 | Jun et al. | |
| 2008/0137025 A1 | 6/2008 | Ueda | |
| 2012/0013594 A1 | 1/2012 | Ishihara et al. | |
| 2013/0033741 A1 | 2/2013 | Mori et al. | |
| 2016/0231607 A1 | 8/2016 | Wu et al. | |
| 2018/0301432 A1 | 10/2018 | Shinohara | |
| 2018/0307077 A1 | 10/2018 | Miura et al. | |
| 2019/0121186 A1 | 4/2019 | Miura et al. | |

FOREIGN PATENT DOCUMENTS

| | | |
|---|---|---|
| CN | 101065421 | 10/2007 |
| CN | 103955096 | 7/2014 |
| JP | H04-146415 | 5/1992 |
| JP | H06-202086 | 7/1994 |
| JP | 9-211469 | 8/1997 |
| JP | 9-318951 | 12/1997 |
| JP | 10-139830 | 5/1998 |
| JP | 2002-166228 | 6/2002 |
| JP | 2003-66464 | 3/2003 |
| JP | 2003-330029 | 11/2003 |
| JP | 2004-354468 | 12/2004 |
| JP | 2007-4142 | 1/2007 |
| JP | 2013-148744 | 8/2013 |
| JP | 2014-89361 | 5/2014 |
| JP | 2014-96371 | 5/2014 |
| JP | 2015-72364 | 4/2015 |
| JP | 2017-187810 | 10/2017 |
| JP | 2017-198732 | 11/2017 |
| JP | 2017-198744 | 11/2017 |
| JP | 2017-211629 | 11/2017 |
| KR | 10-1745599 | 6/2017 |
| WO | 2008/007788 | 1/2008 |
| WO | 2011/123457 | 10/2011 |

OTHER PUBLICATIONS

International Search Report issued Mar. 12, 2019 in International (PCT) Application No. PCT/JP2019/000495.

English Translation of Written Opinion issued Jul. 30, 2020 in corresponding International (PCT) Application No. PCT/JP2019/000495.

Extended European Search Report issued Sep. 10, 2021 in European Patent Application No. 19741576.3.

Notice of Reasons for Refusal issued Feb. 3, 2026 in corresponding Japanese Patent Application No. 2023-104332, with English language translation.

\* cited by examiner

[FIG. 1]
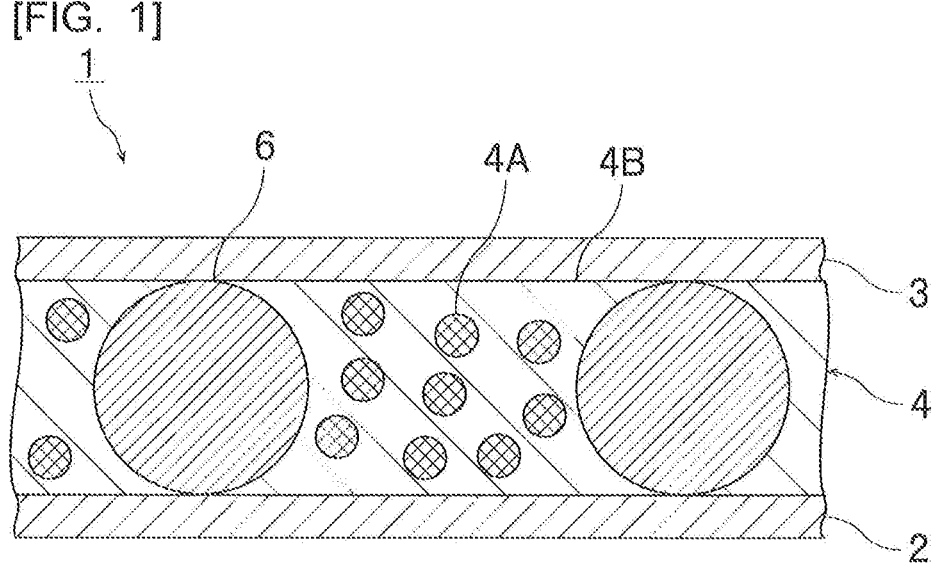
[FIG. 2]
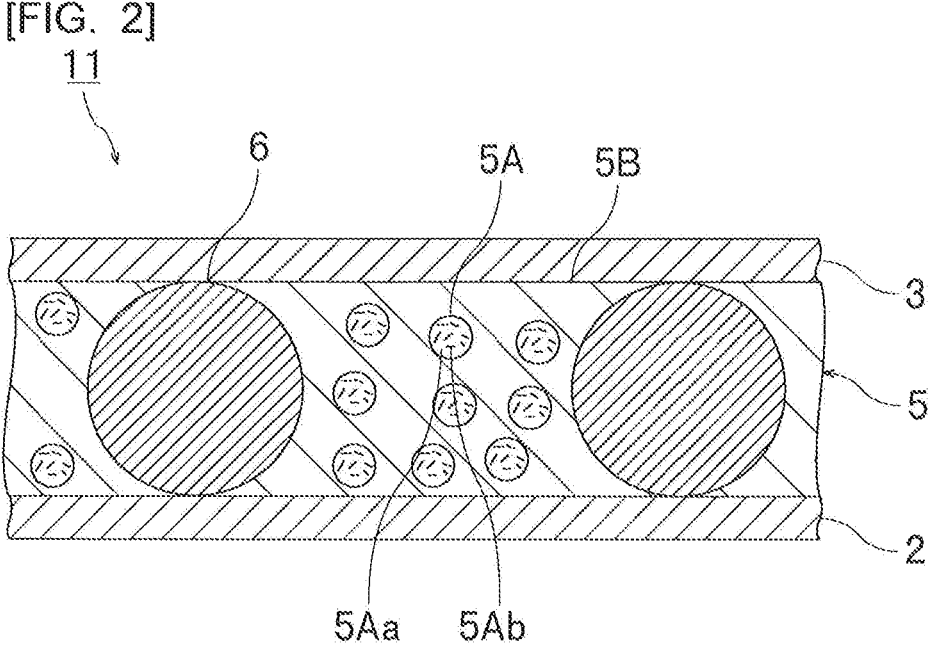

DIMMING LAMINATE AND RESIN SPACER FOR DIMMING LAMINATE

TECHNICAL FIELD

The present invention relates to a dimming laminate having dimming performance, and a resin spacer used for the dimming laminate.

BACKGROUND ART

Dimming materials such as dimming glass and dimming films are materials that can change the state between transparent and opaque depending on whether voltage is applied or not, and can adjust an amount of incident light, haze, etc. The dimming materials are roughly classified into a Polymer Dispersed Liquid Crystal (PDLC) method and a Suspended Particle Device (SPD) method depending on an action mechanism of the state change between the transparent state and the opaque state.

The PDLC method is a method for dispersing liquid crystal in a resin matrix. As a form of the PDLC method, there are, for example, a form in which the liquid crystal and the resin matrix are dispersed as a continuous phase and a form in which the liquid crystal is dispersed as a liquid crystal capsule in the resin matrix. In a state where no voltage is applied, alignment of liquid crystal molecules is not uniform, so that incident light is scattered in the dimming material due to a difference in refractive index between the resin matrix and the liquid crystal, and an opaque state is observed. When a voltage is applied, the liquid crystal molecules are aligned in a direction parallel to the electric field. At this time, since the refractive indexes of the resin matrix and the liquid crystal are equal, the incident light can be transmitted through the dimming material, and a transparent state is observed. Thus, in the PDLC method, light transmittance is adjusted by utilizing alignment of liquid crystal molecules.

The SPD method is a method for dispersing a light-modulating suspension in a resin matrix. The dimming suspension includes light-modulating particles. The light-modulating particles can respond to an electric field. In the SPD method, the light-modulating particles dispersed in the light-modulating suspension absorb, scatter or reflect light by Brownian motion in the state where no voltage is applied; thus, incident light is not transmitted through the dimming material. When a voltage is applied, the light-modulating particles are polarized to be aligned in a direction parallel to the electric field, so that incident light is transmitted through the dimming material. Thus, in the SPD method, the light transmittance can be adjusted by utilizing polarization orientation of the light-modulating particles.

As an example of the dimming material, the following Patent Document 1 discloses a resizable polymer-stabilized, thermotropic liquid crystal device. The liquid crystal device has a transparent substrate. In the liquid crystal device, a mixture of liquid crystal components coats the substrate. The mixture of liquid crystal components has a clearing point within a typical range of atmospheric temperatures and a freezing point below an expected minimum atmospheric temperature. The liquid crystal device has a means of defining a thickness of the coating of the mixture of liquid crystal components. The liquid crystal device has a stabilizing polymer provided in conjunction with the mixture of liquid crystal components on the substrate. The stabilizing polymer cures under the influence of an external stimulus.

The following Patent Documents 2 and 3 each disclose a dimming film which sandwiches a liquid crystal layer between a first laminate and a second laminate including at least an alignment layer and controls alignment of liquid crystal of the liquid crystal layer by driving an electrode provided on the first laminate or the second laminate to control transmitted light.

In the dimming film described in Patent Document 2, arrangement of two or more spacers having a thickness difference value of 0.1 μm or more and 0.6 μm or less in a thickness direction of the liquid crystal layer provides a first region and a second region having different thicknesses in the liquid crystal layer.

In the dimming film described in Patent Document 3, the first laminate is a laminate in which a bead spacer holding the thickness of the liquid crystal layer is provided on a base material made of a transparent film material. A Vickers hardness value B of a portion of the second laminate against which the bead spacer is abutted is 11.8 or more and 35.9 or less. In a state where the first laminate is viewed in plan, a multiplication value A×B of an occupation ratio A which is a ratio of an area occupied by the bead spacer on the first laminate and the Vickers hardness value B is 0.42 or more.

The following Patent Document 4 discloses a dimming film which includes a first laminate in which an alignment layer is provided, a second laminate in which an alignment layer is provided, a liquid crystal layer, a spacer, and an electrode. The dimming film controls alignment of liquid crystal molecules by driving the electrode to control transmitted light. The liquid crystal layer is sandwiched between the first laminate and the second laminate and contains liquid crystal molecules. The spacer holds a thickness of the liquid crystal layer. The electrode is provided on the first laminate or the second laminate. In the dimming film, the spacer is a bead spacer of a transparent member. A proportion of an area occupied by the spacer per unit area in a light controllable-region of the liquid crystal layer is 0.1% or more and 10% or less, when the dimming film is seen in a front view. The liquid crystal layer is a guest-host type liquid crystal layer containing a dichroic dye.

RELATED ART DOCUMENT

Patent Document

Patent Document 1: WO 2011/123457 A1
Patent Document 2: JP 2017-198744 A
Patent Document 3: JP 2017-198732 A
Patent Document 4: JP 2017-187810 A

SUMMARY OF THE INVENTION

Problems to be Solved by the Invention

In a dimming material such as dimming glass and dimming films, a spacer may be used in order to keep a distance (gap) between base materials on which a dimming layer is disposed constant. In the conventional dimming material as described in Patent Documents 1 to 4, due to a large variation in the particle diameter of the spacer, for example, uniformity of the gap between the base materials in the dimming material cannot be ensured, and color unevenness may occur.

Moreover, in conventional dimming materials, when a spacer with a large particle diameter mixes, irregularities may be formed on the dimming material surface, a base material and a dimming layer may be cracked, or the base material may incline. As a result, color unevenness or a phenomenon in which light is transmitted around the spacer (referred to as "light omission") may occur in the dimming material.

The dimming material may be used for vehicle applications or building material applications. An area of the dimming material for vehicle applications or building applications is relatively large. The area of the dimming material for building applications is often larger than the area of the dimming material for vehicle applications. Large-area dimming materials are greatly affected by variations in the particle diameter of the spacer, so that cracking of a base material and a dimming layer, inclination of the base material, or the like tends to occur, and color unevenness and light omission tend to occur in the dimming materials.

An object of the present invention is to provide a dimming laminate which can effectively suppress occurrence of color unevenness and light omission. A further object of the present invention is to provide a resin space for a dimming laminate, which can effectively suppress occurrence of color unevenness and light omission.

Means for Solving the Problems

According to a broad aspect of the present invention, there is provided a dimming laminate including a first transparent base material, a second transparent base material, and a dimming layer disposed between the first transparent base material and the second transparent base material, the dimming layer including a resin spacer, the resin spacer being a plurality of resin particles, and the resin spacer containing no resin particles having a particle diameter of 1.4 times or more an average particle diameter of the resin particles or containing 0.0006% or less of the resin particles having the particle diameter of 1.4 times or more the average particle diameter of the resin particles, relative to 100% of a whole number of the resin particles.

In a specific aspect of the dimming laminate according to the present invention, the resin spacer contains no resin particles having a particle diameter of 1.7 times or more the average particle diameter of the resin particles.

In a specific aspect of the dimming laminate according to the present invention, the resin spacer contains no resin particles having a particle diameter of 0.5 times or less the average particle diameter of the resin particles or contains 0.5% or less of the resin particles having the particle diameter of 0.5 times or less the average particle diameter of the resin particles, relative to 100% of the whole number of the resin particles.

In a specific aspect of the dimming laminate according to the present invention, the average particle diameter of the resin particles is 3 µm or more and 100 µm or less.

In a specific aspect of the dimming laminate according to the present invention, each of the resin particles contains a pigment or dye.

In a specific aspect of the dimming laminate according to the present invention, each of the resin particles contains a pigment.

According to a broad aspect of the present invention, there is provided a resin spacer for a dimming laminate, the resin spacer being a plurality of resin particles, containing no resin particles having a particle diameter of 1.4 times or more an average particle diameter of the resin particles or containing 0.0006% or less of the resin particles having the particle diameter of 1.4 times or more the average particle diameter of the resin particles, relative to 100% of a whole number of the resin particles.

In a specific aspect of the resin spacer for a dimming laminate according to the present invention, the resin particles, a number of which is 1 million or more, are included.

Effect of the Invention

The dimming laminate according to the present invention includes a first transparent base material, a second transparent base material, and a dimming layer disposed between the first transparent base material and the second transparent base material. In the dimming laminate according to the present invention, the dimming layer includes a resin spacer. In the dimming laminate according to the present invention, the resin spacer is a plurality of resin particles. In the dimming laminate according to the present invention, the resin spacer does not contain resin particles having a particle diameter of 1.4 times or more the average particle diameter of the resin particles or contains 0.0006% or less of resin particles having a particle diameter of 1.4 times or more the average particle diameter of the resin particles, relative to 100% of the whole number of the resin particles. The dimming laminate according to the present invention is configured as described above, so that occurrence of color unevenness and light omission can be effectively suppressed.

The resin spacer for a dimming laminate according to the present invention is a plurality of resin particles. In the resin spacer for a dimming laminate according to the present invention, the resin spacer does not contain resin particles having a particle diameter of 1.4 times or more the average particle diameter of the resin particles or contains 0.0006% or less of resin particles having a particle diameter of 1.4 times or more the average particle diameter of the resin particles, relative to 100% of the whole number of the resin particles. In the resin spacer for a dimming laminate according to the present invention is configured as described above, so that occurrence of color unevenness and light omission can be effectively suppressed.

BRIEF DESCRIPTION OF DRAWINGS

FIG. 1 is a sectional view schematically showing a PDLC-type dimming laminate in accordance with a first embodiment of the present invention.

FIG. 2 is a sectional view schematically showing an SPD-type dimming laminate in accordance with a second embodiment of the present invention.

MODE FOR CARRYING OUT THE INVENTION

Hereinafter, the present invention will be described in detail.

(Dimming Laminate)

The dimming laminate according to the present invention includes a first transparent base material, a second transparent base material, and a dimming layer disposed between the first transparent base material and the second transparent base material. In the dimming laminate according to the present invention, the dimming layer includes a resin spacer. In the dimming laminate according to the present invention, the resin spacer is a plurality of resin particles. In the dimming laminate according to the present invention, the resin spacer is an aggregate of a plurality of resin particles and is a powder of the plurality of resin particles.

In the dimming laminate according to the present invention, the resin spacer does not contain resin particles having a particle diameter of 1.4 times or more the average particle diameter of the resin particles or contains 0.0006% or less (6 or less for a million particles, 3 or less for 500,000 particles), of resin particles having a particle diameter of 1.4 times or more the average particle diameter of the resin particles, relative to 100% of the whole number of the resin particles. When the number of resin particles having a particle diameter of 1.4 times or more the average particle diameter of the resin particles is 6 or less for 1 million resin particles, the number of resin particles is 1.2 or less for 200,000 particles.

For example, in the dimming laminate according to the present invention, the resin spacer does not contain resin particles having a particle diameter of 1.4 times or more the average particle diameter of the resin particles or contains 6 or less resin particles having a particle diameter of 1.4 times or more the average particle diameter of the resin particles, for 1 million resin particles. When the number of resin particles having a particle diameter of 1.4 times or more the average particle diameter of the resin particles is 1 for 10,000 resin particles, the number of resin particles having a particle diameter of 1.4 times or more the average particle diameter of the resin particles is 100 for 1 million resin particles.

The dimming laminate according to the present invention is configured as described above, so that occurrence of color unevenness and light omission can be effectively suppressed.

In the dimming laminate according to the present invention, the resin spacer may include the resin particles, the number of which is 500,000 or more or 1 million or more.

The dimming laminate according to the present invention may have a curved surface portion. The dimming laminate according to the present invention may be used in a state having the curved surface portion. In the dimming laminate according to the present invention, the transparent base material may have a curved surface portion and may be used in a state having the curved surface portion. When a conventional dimming material has a curved surface portion, it is very difficult to ensure uniformity of a gap between the base materials in the dimming material. When the conventional dimming material has a curved surface portion, dimming material is greatly affected by variations in the particle diameter of the resin particles, so that cracking of a base material and a dimming layer, inclination of the base material, or the like remarkably occurs as compared to a flat portion, and it is very difficult to suppress occurrence of color unevenness and light omission. However, since the dimming laminate according to the present invention has the above-described configuration, even when the dimming laminate has a curved surface portion, the particle diameter of the resin particles is uniform. Therefore, the uniformity of the gap between the base materials in the dimming material can be ensured, and cracking of the base material and the dimming layer, inclination of the base material, or the like can be suppressed. As a result, occurrence of color unevenness and light omission can be effectively suppressed. When the dimming laminate according to the present invention has a curved surface portion, a curvature of the curved surface portion of the dimming laminate is preferably 30CR or more and 180CR or less. When the curvature of the curved surface portion of the dimming laminate satisfies the above preferred mode, the uniformity of the gap between the base materials can be ensured, and cracking of the base material and the dimming layer, inclination of the base material, or the like can be more effectively suppressed. As a result, the occurrence of color unevenness and light omission can be more effectively suppressed.

Since the effect of the present invention is further exhibited, the dimming laminate preferably has a curved surface portion, and is preferably used in a state having the curved surface portion. The dimming laminate preferably has a bent shape or a curved shape, and is preferably used in a bent shape or a curved shape. The dimming laminate may have a bent portion or a curved portion. The dimming laminate and the transparent base material preferably have flexibility so that they can have a bent shape or a curved shape.

The transparent base material is, for example, a base material having light-transmitting properties (light-transmitting base material). For example, light is transmitted from one side of the transparent base material to the other side through the transparent base material. For example, when a material on one side of the transparent base material is visually observed from the other side of the transparent base material through the transparent base material, the material can be visually recognized. The term transparent includes, for example, translucent. The transparent base material may be colorless and transparent, or colored and transparent.

The dimming laminate may be a dimming film or a dimming glass. The dimming laminate may be a dimming laminate in which the dimming film is sandwiched between transparent base materials such as glass.

Next, specific embodiments of the present invention will be described with reference to the drawings.

FIG. 1 is a sectional view schematically showing a PDLC-type dimming laminate in accordance with a first embodiment of the present invention. FIG. 2 is a sectional view schematically showing an SPD-type dimming laminate in accordance with a second embodiment of the present invention. In FIGS. 1 and 2, the size, thickness, shape, addition amount, etc. of a dimming layer and a resin spacer are appropriately changed from the actual size and shape for convenience of illustration.

The PDLC-type dimming laminate 1 shown in FIG. 1 includes a first base material 2, a second base material 3, and a dimming layer 4. The dimming layer 4 is sandwiched between the first base material 2 and the second base material 3. The dimming layer 4 is disposed between the first base material 2 and the second base material 3. Between the first base material 2 and the second base material 3, a sealing agent (not shown) may be disposed around the dimming layer 4.

The dimming layer 4 includes a liquid crystal capsule 4A, a binder 4B, and a resin spacer 6. The resin spacer 6 is an aggregate of a plurality of resin particles and is a powder of the plurality of resin particles. The resin particles function as spacers. The liquid crystal capsule 4A is a liquid crystal material. The liquid crystal capsule 4A is dispersed in the binder 4B. The liquid crystal capsule 4A is held in a capsule form in the binder 4B. The liquid crystal material may be dispersed in the binder in the form of a capsule and may be dispersed in the binder as a continuous phase.

The resin spacer 6 is used as a resin spacer for a dimming laminate. The resin spacer 6 is in contact with the first base material 2 and the second base material 3. The resin spacer 6 controls a gap between the first base material 2 and the second base material 3.

Transparent electrodes are formed on the surface of the first base material 2 and on the surface of the second base material 3 (not shown). Examples of the material for the transparent electrode include indium tin oxide (ITO).

In the state where no voltage is applied to the PDLC-type dimming laminate 1, the alignment of the liquid crystal molecules in the liquid crystal capsule 4A is not uniform, so that incident light is scattered in the binder due to a difference in refractive index between the binder 4B and the liquid crystal material, and an opaque state is shown.

When a voltage is applied to the PDLC-type dimming laminate 1, the liquid crystal molecules in the liquid crystal capsule 4A are arranged in a direction parallel to the electric field. In this state, when the refractive indexes of the binder 4B and the liquid crystal material are equal, light can be transmitted, and a transparent state is obtained.

An SPD-type dimming laminate 11 shown in FIG. 2 includes the first base material 2, the second base material 3, and a dimming layer 5. The dimming layer 5 is sandwiched between the first base material 2 and the second base material 3. The dimming layer 5 is disposed between the first base material 2 and the second base material 3.

The dimming layer 5 includes droplets 5A of a light-modulating suspension, a resin matrix 5B, and the resin spacer 6. The resin spacer 6 is an aggregate of a plurality of resin particles and is a powder of the plurality of resin particles. The resin particles function as spacers. The droplets 5A of the light-modulating suspension are dispersed in the resin matrix 5B. The droplet 5A of the light-modulating suspension is held in a droplet state in the resin matrix 5B.

The droplet 5A of the light-modulating suspension includes a dispersion medium 5Aa and light-modulating particles 5Ab. The light-modulating particles 5Ab are dispersed in the dispersion medium 5Aa.

The resin spacer 6 is used as a resin spacer for a dimming laminate. The resin spacer 6 is in contact with the first base material 2 and the second base material 3. The resin spacer 6 controls a gap between the first base material 2 and the second base material 3.

Transparent electrodes are formed on the surface of the first base material 2 and on the surface of the second base material 3 (not shown). Examples of the material for the transparent electrode include indium tin oxide (ITO).

In the state where no voltage is applied to the SPD-type dimming laminate 11, incident light is absorbed, scattered or reflected by Brownian motion of the light-modulating particles 5Ab dispersed in the dispersion medium 5Aa constituting the droplet 5A of the light-modulating suspension, and cannot be transmitted through the dimming layer 5, and an opaque state is shown.

When a voltage is applied to the SPD-type dimming laminate 11, the light-modulating particles 5Ab are arranged in a direction parallel to the electric field. Thus, incident light can pass between the arranged light-modulating particles 5Ab, and a transparent state is obtained.

Hereinafter, other details of the present invention will be described.

(Resin Spacer)

The resin spacer according to the present invention is preferably a resin spacer used for a dimming laminate. Specifically, the resin spacer for a dimming laminate according to the present invention is preferably a resin spacer used for a dimming layer in a dimming laminate including a first transparent base material, a second transparent base material, and the dimming layer disposed between the first transparent base material and the second transparent base material. The resin spacer for a dimming laminate according to the present invention is a plurality of resin particles. In the resin spacer for a dimming laminate according to the present invention, the resin spacer does not contain resin particles having a particle diameter of 1.4 times or more the average particle diameter of the resin particles or contains 0.0006% or less of resin particles having a particle diameter of 1.4 times or more the average particle diameter of the resin particles, relative to 100% of the whole number of the resin particles.

For example, the resin spacer according to the present invention does not contain resin particles having a particle diameter of 1.4 times or more the average particle diameter of the resin particles or contains 6 or less (6 or less for 1 million particles, 3 or less for 500,000 particles) resin particles having a particle diameter of 1.4 times or more the average particle diameter of the resin particles, for 1 million resin particles. When the number of resin particles having a particle diameter of 1.4 times or more the average particle diameter of the resin particles is 6 or less for 1 million resin particles, the number of resin particles is 1.2 or less for 200,000 particles.

The resin spacer according to the present invention is configured as described above, so that occurrence of color unevenness and light omission can be effectively suppressed.

The resin spacer according to the present invention may include the resin particles, the number of which is 500,000 or more or 1 million or more.

The resin spacer preferably contains 0.0006% or less of resin particles having a particle diameter of 1.4 times or more the average particle diameter of the resin particles, relative to 100% of the whole number of the resin spacers, more preferably 0.0005% or less, further preferably 0.0004% or less, particularly preferably 0.0002% or less (2 or less for 1 million particles). It is particularly preferable that the resin spacer do not contain resin particles having a particle diameter of 1.4 times or more the average particle diameter of the resin particles. The resin spacer may include the resin particles, the number of which is 200,000 or more, 500,000 or more, or 1 million or more. It is preferable that the resin spacer contain the resin particles, the number of which is 500,000 or more, and do not contain resin particles having a particle diameter of 1.4 times or more the average particle diameter of the resin particles. It is more preferable that the resin spacer contain the resin particles, the number of which is 1 million or more, and do not contain resin particles having a particle diameter of 1.4 times or more the average particle diameter of the resin particles. When the resin spacer satisfies the above preferred mode, it is possible to more effectively prevent formation of irregularities on the surface of the dimming laminate, cracking of the base material and the dimming layer, inclination of the base material, or the like. As a result, when the resin spacer satisfies the above-described preferred mode, the occurrence of color unevenness and light omission can be more effectively suppressed in the dimming laminate.

Examples of a method for obtaining a resin spacer satisfying the above preferred mode include a method for selecting resin particles having a target particle diameter using a classifier. Examples of the classifying method include a method using the principle of inertial force and a method using a particle diameter size.

The resin spacer preferably does not contain resin particles having a particle diameter of 1.5 times or more the average particle diameter of the resin particles, and particularly preferably does not contain resin particles having a particle diameter of 1.7 times or more the average particle diameter of the resin particles. It is preferable that the resin spacer contain the resin particles, the number of which is 500,000 or more, and do not contain resin particles having a particle diameter of 1.5 times or more the average particle diameter of the resin particles, and it is more preferable that the resin spacer contain the resin particles, the number of which is 500,000 or more, and do not contain resin particles having a particle diameter of 1.7 times or more the average particle diameter of the resin particles. It is preferable that the resin spacer contain the resin particles, the number of which is 1 million or more, and do not contain resin particles having a particle diameter of 1.5 times or more the average particle diameter of the resin particles, and it is more preferable that the resin spacer contain the resin particles, the number of which is 1 million or more, and do not contain resin particles having a particle diameter of 1.7 times or more the average particle diameter of the resin particles. When the resin spacer satisfies the above preferred mode, it is possible to more effectively prevent formation of irregularities on the surface of the dimming laminate, cracking of the base material and the dimming layer, inclination of the base material, or the like. As a result, when the resin spacer satisfies the above-described preferred mode, the occurrence of color unevenness and light omission can be more effectively suppressed in the dimming laminate.

Examples of a method for obtaining a resin spacer satisfying the above preferred mode include a method for selecting resin spacers having a target particle diameter using a classifier. Examples of the classifying method include a method using the principle of inertial force and a method using a particle diameter size.

It is preferable that the resin spacer do not contain resin particles having a particle diameter of 0.5 times or less the average particle diameter of the resin particles or contain 0.5% or less (5 or less for 1000 particles) of resin particles having a particle diameter of 0.5 times or less the average particle diameter of the resin particles, relative to 100% of the whole number of the resin particles. The resin spacer more preferably contains 0.3% or less (3 or less for 1000 particles) of resin particles having a particle diameter of 0.5 times or less the average particle diameter of the resin particles, relative to 100% of the whole number of the resin particles. It is particularly preferable that the resin spacer do not contain resin particles having a particle diameter of 0.5 times or less the average particle diameter of the resin particles. When the resin spacer satisfies the above preferred mode, it is possible to more effectively prevent damage on the base material in the dimming laminate, and it is possible to more effectively improve the dimming performance for adjusting an amount of incident light, haze, etc.

Examples of a method for obtaining a resin spacer satisfying the above preferred mode include a method for selecting resin spacers having a target particle diameter using a classifier. Examples of the classifying method include a method using the principle of inertial force and a method using a particle diameter size.

From the viewpoint of practicality, the average particle diameter of the resin particles is preferably 3 μm or more, more preferably 5 μm or more, further preferably 7 μm or more, and preferably 100 μm or less, more preferably 50 μm or less, further preferably 30 μm or less. When the average particle diameter of the resin particles is 3 μm or more and 100 μm or less, the resin particles can be suitably used for the dimming laminate.

The average particle diameter of the resin particles is preferably a number average particle diameter. In the average particle diameter of the resin particles, the particle diameter of the resin particles can be determined by an arbitrary particle diameter measuring device. For example, a particle diameter distribution measuring machine using principles such as laser light scattering, electric resistance change, and image analysis after imaging can be used. Specific examples of as a method for measuring the average particle diameter of the resin particles include a method for measuring the particle diameter of about 100,000 resin particles using a particle diameter distribution measuring device ("Multisizer 4" manufactured by Beckman Coulter, Inc.) and measuring the average particle diameter.

The particle diameter of the resin particle means a diameter when the resin particle is a true sphere. When the resin particle has a shape other than a true sphere, the particle diameter of the resin particle means a diameter when it is assumed that the resin particle is a true sphere corresponding to the volume.

An aspect ratio of the resin particles is preferably 1.5 or less, more preferably 1.3 or less. A lower limit of the aspect ratio of the resin particles is not particularly limited. The aspect ratio of the resin particles may be 1 or more. The aspect ratio of the resin particles indicates a major axis length/minor axis length. When the aspect ratio of the resin particles is equal to or less than the upper limit, the resin spacers can be suitably used for the dimming laminate.

The aspect ratio of the resin particles was determined by observing 10 arbitrary resin particles with an electron microscope or an optical microscope and, provided that the maximum diameter and a minimum diameter is a major axis length and a minor axis length, respectively, calculating an average value of the major axis length/minor axis length of each resin particle.

A variation coefficient (CV value) of the particle diameter of the resin particles is preferably 10% or less, more preferably 7% or less. A lower limit of the variation coefficient (CV value) of the particle diameter of the resin particles is not particularly limited. When the variation coefficient (CV value) of the particle diameter of the resin particles is equal to or less than the above upper limit, in the dimming laminate, it is possible to more effectively prevent formation of irregularities on the surface of the dimming laminate, cracking of the base material and the dimming layer, inclination of the base material, or the like. As a result, in the dimming laminate, the occurrence of color unevenness and light omission can be more effectively suppressed.

The variation coefficient (CV value) can be measured as follows.

$$CV \text{ value } (\%) = (\rho/Dn) \times 100$$

$\rho$: standard deviation of particle diameter of resin particles $Dn$: average value of particle diameter of resin particles The shape of the resin particles is not particularly limited. The shape of the resin particles may be spherical, and may have a shape other than a spherical shape, such as a flat shape.

The 10% K value of the resin particles is preferably 1000 $N/mm^2$ or more, more preferably 3000 $N/mm^2$ or more, and preferably 10000 $N/mm^2$ or less, more preferably 7000 $N/mm^2$ or less. When the 10% K value of the resin particles is equal to or more than the above lower limit, a gap between base materials can be made more uniform in the dimming laminate. When the 10% K value of the resin particles is equal to or less than the above upper limit, it is possible to more effectively prevent damage on the base material in the dimming laminate, and it is possible to more effectively improve the dimming performance for adjusting an amount of incident light, haze, etc.

The 20% K value of the resin particles is preferably 1000 $N/mm^2$ or more, more preferably 3000 $N/mm^2$ or more, and preferably 10000 $N/mm^2$ or less, more preferably 7000 $N/mm^2$ or less. When the 20% K value of the resin particles is equal to or more than the above lower limit, the gap between the base materials can be made more uniform in the dimming laminate. When the 20% K value of the resin particles is equal to or less than the above upper limit, it is possible to more effectively prevent damage on the base material in the dimming laminate, and it is possible to more effectively improve the dimming performance for adjusting an amount of incident light, haze, etc.

The 10% K value and 20% K value of the resin particles can be measured as follows.

Using a micro compression testing machine, a particle is compressed at a smooth indenter end face of a cylinder (diameter of 100 μm, made of diamond) under the conditions of compression rate of 0.3 mN/sec and a maximum test load of 20 mN at 25° C. The load value (N) and compression displacement (mm) at this time are measured. From the obtained measurement values, the 10% K value (10% compression modulus) and the 20% K value (20% compression modulus) of the resin particles can be determined by the following equation. As the micro compression testing machine, for example, "Micro compression testing machine MCT-W200" manufactured by Shimadzu Corporation, "Fischer Scope H-100" manufactured by FISCHER INSTRUMENTS K.K., or the like is used. The 10% K value and 20% K value of the resin particles are preferably calculated by arithmetically averaging the 10% K value or 20% K value of 50 resin particles arbitrarily selected.

$$10\% \ K \ \text{value or} \ 20\% \ K \ \text{value} \ (N/mm^2) = (3/2^{1/2}) \cdot F \cdot S^{-3/2} \cdot R^{-1/2}$$

F: Load value (N) when the diameter of the resin particle decreases by 10% by deformation or load value (N) when the diameter of the resin particle decreases by 20% by deformation S: Compression deformation (mm) when the diameter of the resin particle decreases by 10% by deformation or compression deformation (mm) when the diameter of the resin particle decreases by 20% by deformation R: Radius of resin particles (mm)

The K value indicates hardness of a resin particle universally and quantitatively. Hardness of the resin particle can be indicated by the K value quantitatively and unambiguously.

A compression recovery rate of the resin particle is preferably 30% or more, more preferably 40% or more, and preferably 95% or less, more preferably 90% or less. When the compression recovery rate of the resin particles is equal to or more than the above lower limit and equal to or less than the above upper limit, the gap between the base materials can be made more uniform in the dimming laminate, and occurrence of color unevenness can be more effectively suppressed.

The compression recovery rate of the resin particles can be measured as follows.

The resin particles are spread on a sample stage. Using a micro compression testing machine, one of the spread particles is subjected to a load (reverse load value) in the center direction of the resin particles at a smooth indenter end face of a cylinder (diameter of 100 μm, made of diamond) at 25° C. until a load of 1 gf is applied to the resin particle. After that, unloading is performed up to an origin load value (0.40 mN). The load-compression displacement during this period is measured, and the compression recovery rate can be obtained from the following equation. The loading rate is 0.33 mN/sec. As the micro compression testing machine, for example, "Micro compression testing machine MCT-W200"

manufactured by Shimadzu Corporation, "Fischer Scope H-100" manufactured by FISCHER INSTRUMENTS K.K., or the like is used.

$$\text{Compression recovery rate} \ (\%) = [L2/L1] \times 100$$

L1: Compression displacement from the origin load value to the reverse load value when a load is applied L2: Unloading displacement from the reverse load value to the origin load value when a load is released The strain to failure of the resin particle is preferably 30% or more, more preferably 40% or more, and preferably 80% or less, more preferably 70% or less. When the strain to failure of the resin particles is equal to or more than the above lower limit and equal to or less than the above upper limit, the gap between the base materials can be made more uniform in the dimming laminate, and occurrence of color unevenness can be more effectively suppressed.

The strain to failure of the resin particles can be measured as follows.

The resin particles are spread on a sample stage. Using a micro compression testing machine, one of the spread particles is subjected to a load in the center direction of the resin particles until the resin particle is broken. After that, the displacement is measured when the resin particle is broken. The ratio of displacement at the time when the resin particle is broken with respect to the particle diameter of the resin particle is defined as the strain to failure. The loading rate is 0.33 mN/sec. As the micro compression testing machine, for example, "Micro compression testing machine MCT-W200" manufactured by Shimadzu Corporation, "Fischer Scope H-100" manufactured by FISCHER INSTRUMENTS K.K., or the like is used.

A total light ray transmittance of the resin particles is preferably 5% or less, more preferably 4% or less. A lower limit of the total light ray transmittance of the resin particles is not particularly limited. When the total light ray transmittance of the resin particles is equal to or less than the above upper limit, it is possible to more effectively prevent occurrence of a phenomenon (light leakage) in which light is transmitted from the spacer portion in the dimming laminate, and it is possible to more effectively suppress occurrence of color unevenness.

The total light ray transmittance of the resin particles can be measured as follows.

An evaluation sample is produced in which a transparent double-sided tape is applied to a surface of a transparent plate (transparent acrylic plate etc.), and resin particles are uniformly and tightly arranged on an adhesive surface of the double-sided tape, and the resin particles are arranged in a single layer on the double-sided tape. The total light ray transmittance is measured using the obtained evaluation sample. The total light ray transmittance can be measured using, for example, a spectrophotometer ("V-670" manufactured by JASCO Corporation). An integrating sphere can be used as a detector.

From the viewpoint of further preventing elution and diffusion of impurities, the surface of the resin particles are preferably coated with a coating agent such as a silane coupling agent. A coating film using the coating agent is preferably a monomolecular film or a polymer film. The resin particles may not have the coating film.

The silane coupling agent is not particularly limited. Examples of the silane coupling agent include amino-based silane coupling agents such as γ-aminopropyltrimethoxysilane, N-β-(aminoethyl)-γ-aminopropyltrimethoxysilane, 3-[N-allyl-N-(2-aminoethyl)]aminopropyltrimethoxysilane, 3-(N-allyl-N-glycidyl)aminopropyltrimethoxysilane, 3-(N-allyl-N-methacryl)aminopropyltrimethoxysilane, and 3-(N, N-diglycidyl)aminopropyltrimethoxysilan; amido-based silane coupling agents such as N,N-bis[3-(methyldimethoxysilyl)propyl]amine, N,N-bis[3-(trimethoxysilyl)propyl] amine, N,N-bis[3-(methyldimethoxysilyl)propyl]ethylenediamine, N,N-bis[3-(trimethoxysilyl)propyl] ethylenediamine, N-glycidyl-N,N-bis[3-(methyldimethoxysilyl)propyl]amine, and N-glycidyl-N,N-bis[3-(trimethoxysilyl)propyl]amine; vinyl-based silane coupling agents such as vinyltriethoxysilane and vinyl-tris (2-methoxyethoxy)silane; methacrylic silane coupling agents such as γ-methacryloxypropyltrimethoxysilane; glycidyl-based silane coupling agents such as γ-glycidoxypropyltrimethoxysilane; and mercapto-based silane coupling agents such as γ-mercaptopropyltrimethoxysilane.

A method for coating a surface with a coating agent to obtain resin particles is not particularly limited. Examples of the method for coating a surface with a coating agent to obtain resin particles include the following methods: a method in which the resin particles (before coating) and the above coating agent are mixed in an inorganic solvent such as water or an organic solvent such as alcohol, and heated under stirring, and the heated resin particles are separated by decantation or the like, followed by drying under reduced pressure to remove the solvent; and a method in which resin particles (before coating) and the above coating agent are directly mixed and heated.

The resin spacer is used for a dimming laminate. The resin spacer may be used as a spacer for dimming glass or a spacer for dimming film.

The resin particles preferably contain a pigment or dye. The resin particles preferably include a base material particle body and a pigment or dye contained in the base material particle body. The base material particle body is preferably a resin particle body, and is preferably a resin particle. In the present specification, "(meth)acrylate" means one or both of "acrylate" and "methacrylate", and "(meth) acryl" means one or both of "acryl" and "methacryl".

Various organic materials are suitably used as materials of the resin particle and materials of the base material particle body. Examples of the material for the resin particle and the material for the base material particle body include polyolefin resins such as polyethylene, polypropylene, polystyrene, polyvinyl chloride, polyvinylidene chloride, polyisobutylene, and polybutadiene; acrylic resins such as polymethyl methacrylate and polymethyl acrylate; polycarbonate, polyamide, phenol formaldehyde resin, melamine formaldehyde resin, benzoguanamine formaldehyde resin, urea formaldehyde resin, phenol resin, melamine resin, benzoguanamine resin, urea resin, epoxy resin, unsaturated polyester resin, saturated polyester resin, polyethylene terephthalate, polysulfone, polyphenylene oxide, polyacetal, polyimide, polyamideimide, polyether ether ketone, polyether sulfone, divinylbenzene polymer, and divinylbenzene copolymer. Examples of the divinylbenzene copolymer include divinylbenzene-styrene copolymer and divinylbenzene-(meth)acrylate copolymer. Since compression deformation characteristics of the resin particle can be easily controlled within a preferable range, the material for the resin particle and the material for the base material particle body are each preferably a polymer obtained by polymerizing one or two or more polymerizable monomers having an ethylenically unsaturated group.

When the resin particle and the base material particle body are obtained by polymerizing a polymerizable monomer having an ethylenically unsaturated group, examples of the polymerizable monomer having an ethylenically unsaturated group include non-crosslinkable monomers and crosslinkable monomers.

Examples of the non-crosslinkable monomers include, as a vinyl compound, styrene monomers such as styrene, α-methyl styrene, and chlorostyrene; a vinyl ether compound such as methyl vinyl ether, ethyl vinyl ether, and propyl vinyl ether; an acid vinyl ester compound such as vinyl acetate, vinyl butylate, vinyl laurate, and vinyl stearate; and a halogen-containing monomer such as vinyl chloride, and vinyl fluoride; as a (meth)acrylic compound, an alkyl (meth)acrylate compound such as methyl (meth)acrylate, ethyl (meth)acrylate, propyl (meth) acrylate, butyl (meth)acrylate, 2-ethylhexyl (meth) acrylate, lauryl (meth) acrylate, cetyl (meth)acrylate, stearyl (meth)acrylate, cyclohexyl (meth)acrylate, and isobornyl (meth)acrylate; an oxygen atom-containing (meth)acrylate compound such as 2-hydroxyethyl (meth)acrylate, glycerol (meth)acrylate, polyoxyethylene (meth) acrylate, and glycidyl (meth) acrylate; a nitrile-containing monomer such as (meth)acrylonitrile; and a halogen-containing (meth)acrylate compound such as trifluoromethyl (meth)acrylate, and pentafluoroethyl (meth)acrylate; as an α-olefin compound, an olefin compound such as diisobutylene, isobutylene, LINEALENE, ethylene, and propylene; and as a conjugated diene compound, isoprene, butadiene, and the like.

Examples of the crosslinkable monomer include, as a vinyl compound, a vinyl-based monomer such as divinylbenzene, 1,4-divinyloxybutane, and divinyl sulfone; as a (meth)acrylic compound, a polyfunctional (meth)acrylate compound such as tetramethylolmethane tetra(meth)acrylate, polytetramethylene glycol diacrylate, tetramethylolmethane tri(meth)acrylate, tetramethylolmethane di(meth) acrylate, trimethylolpropane tri(meth)acrylate, dipentaerythritol hexa(meth)acrylate, dipentaerythritol penta(meth)acrylate, glycerol tri(meth)acrylate, glycerol di(meth)acrylate, polyethylene glycol di(meth)acrylate, polypropylene glycol di(meth)acrylate, polytetramethylene glycol di(meth)acrylate, and 1,4-butanediol di(meth)acrylate; as an allyl compound, triallyl (iso)cyanurate, triallyl trimellitate, diallyl phthalate, diallyl acrylamide, and diallyl ether; as a silane compound, a silane alkoxide compound such as tetramethoxysilane, tetraethoxysilane, methyltrimethoxysilane, methyltriethoxysilane, ethyltrimethoxysilane, ethyltriethoxysilane, isopropyltrimethoxysilane, isobutyltrimethoxysilane, cyclohexyl trimethoxysilane, n-hexyltrimethoxysilane, n-octyltriethoxysilane, n-decyltrimethoxysilane, phenyltrimethoxysilane, dimethyldimethoxysilane, dimethyidiethoxysilane, diisopropyldimethoxysilane, trimethoxysilyl styrene, γ-(meth) acryloxypropyltrimethoxysilane, 1,3-divinyltetramethyldisiloxane, methylphenyldimethoxysilane, and diphenyidimethoxysilane; a polymerizable double bond-containing silane alkoxide such as vinyltrimethoxysilane, vinyltriethoxysilane, dimethoxymethylvinylsilane, dimethoxyethylvinylsilane, diethoxymethylvinylsilane, diethoxyethylvinylsilane, ethylmethyldivinylsilane, methylvinyldimethoxysilane, ethylvinyldimethoxysilane, methylvinyldiethoxysilane, ethylvinyldiethoxysilane, p-styryltrimethoxysilane, 3-methacryloxypropylmethyldimethoxysilane, 3-methacryloxypropyl trimethoxysilane, 3-methacryloxypropylmethyldiethoxysilane, 3-methacryloxypropyl triethoxy silane, and 3-acryloxypropyltrimethoxysilane; a cyclic siloxane such as decamethylcyclopentasiloxane; a modified (reactive) silicone oil such as one-terminal modified silicone oil, both-terminal silicone oil, and side-chain type silicone oil; and a carboxyl group-containing monomer such as (meth)acrylic acid, maleic acid, and maleic anhydride.

The resin particle and the base material particle body can be obtained by polymerizing the polymerizable monomer having an ethylenically unsaturated group. The resin particle and the base material particle body can be polymerized by uniformly mixing and dispersing a pigment or a dye in the polymerizable monomer having an ethylenically unsaturated group. The polymerization method is not particularly limited, and the polymerization can be performed by a known method. Examples of the polymerization method include radical polymerization, ionic polymerization, polycondensation (condensation polymerization), addition condensation, living polymerization, and living radical polymerization. Specific examples include a method for suspension polymerization in the presence of a radical polymerization initiator, and a seed polymerization method and dispersion polymerization method as a method for swelling and polymerizing monomers together with a radical polymerization initiator using non-crosslinked seed particles.

In order to uniformly mix and disperse a pigment or dye in the polymerizable monomer having an ethylenically unsaturated group, a ball mill, a bead mill, a sand mill, an attritor, a sand grinder, a nanomizer, or the like may be used. In this case, a dispersant or the like may be added in order to improve dispersibility of the pigment or dye.

The dispersant is not particularly limited. Examples of the dispersant include water-soluble polymers such as polyvinyl alcohol, starch, methyl cellulose, carboxymethyl cellulose, hydroxyethyl cellulose, and sodium poly(meth)acrylate. Furthermore, examples of the dispersant include barium sulfate, calcium sulfate, aluminum sulfate, calcium carbonate, calcium phosphate, talc, clay, and metal oxide powder.

(Pigment or Dye)

The resin particles according to the present invention preferably contain a pigment or a dye. The resin particles may contain both the pigment and the dye, may contain only the pigment, or may contain only the dye. The pigment or the dye is preferably a pigment or dye that can reduce the total light ray transmittance of the resin particles to 7% or less. The pigment may be a black pigment, a navy blue pigment, or a dark brown pigment. In the dimming laminate, from the viewpoint of more effectively preventing occurrence of light omission and more effectively suppressing occurrence color unevenness, the pigment may be a black pigment. In the dimming laminate, from the viewpoint of more effectively preventing occurrence of light omission and more effectively suppressing occurrence color unevenness, the dye may be a black dye. The resin particles may contain both the black pigment and the black dye, may contain only the black pigment, or may contain only the black dye.

Examples of the black pigment include carbon black, lamp black, graphite, iron oxide, copper-chromium composite oxide, and copper-chromium-zinc composite oxide. One kind of the black pigments may be used alone, and two or more kinds thereof may be used in combination.

Examples of the navy blue pigment include copper phthalocyanine, cobalt phthalocyanine, and cobalt aluminate. One kind of the navy blue pigments may be used alone, and two or more kinds thereof may be used in combination.

Examples of the dark brown pigment include zinc ferrite and iron oxide. One kind of the dark brown pigments may be used alone, and two or more kinds thereof may be used in combination.

Examples of the black dye include pyrazole azo-based dyes, anilino azo-based dyes, triphenylmethane-based dyes, anthraquinone-based dyes, anthrapyridone-based dyes, benzylidene-based dyes, oxol-based dyes, pyrazolotriazole azo-based dyes, pyridone azo-based dyes, cyanine-based dyes, phenothiazine-based dyes, pyrrolopyrazole azomethine-based dyes, xanthene-based dyes, phthalocyanine-based dyes, benzopyran-based dyes, indigo-based dyes, pyromethene-based dyes, triarylmethane-based dyes, azomethine-based dyes, berylene-based dyes, perinone-based dyes, quaterrylene-based dyes, and quinophthalone-based dyes. Further, examples include acid dyes, direct dyes, basic dyes, mordant dyes, acid mordant dyes, azoic dyes, disperse dyes, oil-soluble dyes, food dyes and dyes made black by mixing two or more derivatives thereof. One kind of the black dyes may be used alone, and two or more kinds thereof may be used in combination.

When the resin particles contain a pigment, the pigment is preferably carbon black, titanium black, aniline black, or iron oxide. One kind of the pigments may be used alone, and two or more kinds thereof may be used in combination. In the dimming laminate, from the viewpoint of more effectively preventing occurrence of light omission and more effectively suppressing occurrence color unevenness, when the resin particle contains a pigment, the pigment is preferably carbon black.

The carbon black is not particularly limited. Examples of the carbon black include channel black, roll black, furnace black, thermal black, ketjen black, and acetylene black. One kind of the carbon black may be used alone, and two or more kinds thereof may be used in combination.

When the resin particles contain a dye, the dye is preferably an acid dye. One kind of the dyes may be used alone, and two or more kinds thereof may be used in combination.

From the viewpoint of further preventing elution and diffusion of impurities, when the resin particle contains a pigment, the pigment is preferably a pigment having a coated surface. The pigment preferably has a surface coated with a polymer. The surface of the pigment is preferably coated with a polymer. From the viewpoint of further preventing elution and diffusion of impurities, the surface of the carbon black is preferably coated with a polymer. The surface of the carbon black is preferably coated with a polymer. By using the pigment having a coated surface, even if the amount of the pigment is increased, it is possible to effectively prevent a decrease in characteristics such as electric resistance of the resin particles. Furthermore, the dispersibility of the pigment is improved when the surface is coated, and the resin particles can be colored with a smaller amount of the pigment. Examples of materials for coating the surface of the pigment include thermoplastic resins.

The thermoplastic resin is not particularly limited. Examples of the thermoplastic resin include alkyd resin, modified alkyd resin, phenolic resin, natural resin-modified phenolic resin, maleic acid resin, natural resin-modified maleic acid resin, fumaric acid resin, ester gum, rosin, petroleum resin, coumarone resin, indene resin, polyester resin, polyimide resin, polyamide resin, polycarbonate resin, polyethylene resin, epoxy resin, phenoxy resin, styrene resin, vinyl resin, acrylic resin, chlorinated rubber, benzoguanamine resin, urea resin, polyolefin resin, ethylene-vinyl acetate copolymer, and urethane resin. One kind of the thermoplastic resins may be used alone, and two or more kinds thereof may be used in combination.

A method for coating the surface of the pigment using the thermoplastic resin is not particularly limited. Examples of the method for coating the surface of the pigment using the thermoplastic resin include a method for pulverizing the pigment in the presence of a hydrophobic medium containing the thermoplastic resin by means of a crusher such as a ball mill and a method for adding and mixing an aqueous dispersion of the pigment with a hydrophobic medium containing the thermoplastic resin to prepare an emulsion and removing water by heating.

The total content of the pigment and the dye in 100% by weight of the resin particles is preferably 2% by weight or more, more preferably 3% by weight or more, and preferably 40% by weight or less, more preferably 20% by weight or less. When the total content of the pigment and the dye is equal to or more than the above lower limit and equal to or less than the above upper limit, in the dimming laminate, it is possible to more effectively prevent occurrence of a light leakage, and it is possible to more effectively suppress occurrence of color unevenness.

The content of the pigment in 100% by weight of the resin particles is preferably 2% by weight or more, more preferably 3% by weight or more, and preferably 10% by weight or less, more preferably 8% by weight or less. When the content of the pigment is equal to or more than the above lower limit and equal to or less than the above upper limit, in the dimming laminate, it is possible to more effectively prevent occurrence of a light leakage, and it is possible to more effectively suppress occurrence of color unevenness.

The content of the dye in 100% by weight of the resin particles is preferably 3% by weight or more, more preferably 5% by weight or more, and preferably 40% by weight or less, more preferably 20% by weight or less. When the content of the dye is equal to or more than the above lower limit and equal to or less than the above upper limit, in the dimming laminate, it is possible to more effectively prevent occurrence of a light leakage, and it is possible to more effectively suppress occurrence of color unevenness.

(Dimming Layer)

The dimming layer according to the present invention preferably has a dimming property. The dimming property is a property where light transmittance or the like changes depending on whether or not a voltage is applied, and the amount of incident light and haze can be adjusted. The material for the dimming layer is not particularly limited. The material for the dimming layer may be any material as long as the material has the dimming property.

(PDLC Type)

When the dimming laminate according to the present invention is of the PDLC type, the dimming layer preferably includes a binder and a liquid crystal material dispersed in the binder.

The liquid crystal material is not particularly limited. The liquid crystal material may be any liquid crystal material as long as the liquid crystal material has a property that its alignment changes depending on a voltage application state. The liquid crystal material may be dispersed as a continuous phase in the binder, or may be dispersed in the binder in a liquid crystal drop shape or a liquid crystal capsule shape. Examples of the liquid crystal material include nematic liquid crystal and cholesteric liquid crystal.

Examples of materials of the cholesteric liquid crystal include a steroid cholesterol derivative, a nematic liquid crystal such as a Schiff base series, an azo series, an azoxy series, a benzoate ester series, a biphenyl series, a terphenyl series, a cyclohexylcarboxylate ester series, a phenylcyclohexane series, a biphenylcyclohexane series, a pyrimidine series, a dioxane series, a cyclohexylcyclohexane ester series, a cyclohexylethane series, a cyclohexane series, a tolan series, an alkenyl series, a stilbene series and a condensed polycyclic series, and smectic liquid crystal. Furthermore, examples of the material for the cholesteric liquid crystal include materials obtained by adding chiral components made of optically active materials such as a Schiff base series, an azo series, an ester series, and a biphenyl series to these mixed liquid crystals. One kind of the cholesteric liquid crystal materials may be used alone, and two or more kinds thereof may be used in combination.

The binder holds the liquid crystal material and suppresses the flow of the liquid crystal material. The binder is not particularly limited as long as it does not dissolve in the liquid crystal material, has a strength that can withstand external force, and has high transparency to reflected light and incident light. Examples of materials for the binder include water-soluble polymer materials such as gelatin, polyvinyl alcohol, cellulose derivatives, polyacrylic acid polymers, ethyleneimine, polyethylene oxide, polyacrylamide, polystyrene sulfonate, polyamidine, and isoprene sulfonic acid polymers. Furthermore, examples of materials for the binder include materials that can be made into an aqueous emulsion, such as fluororesin, silicone resin, acrylic resin, urethane resin, and epoxy resin. One kind of the materials for the binder may be used alone, and two or more kinds thereof may be used in combination.

The binder is preferably cross-linked with a cross-linking agent. The cross-linking agent is not particularly limited as long as it is a compound in which crosslinking is formed between the binders and which hardens the binder, makes the binder hardly soluble, or makes the binder insoluble. Examples of the cross-linking agent include acetaldehyde, glutaraldehyde, glyoxal, potassium alum hydrate of a multivalent metal salt compound, adipic acid dihydrazide, melamine formalin oligomer, ethylene glycol diglycidyl ether, polyamide epichlorohydrin, and polycarbodiimide. One kind of the cross-linking agents may be used alone, and two or more kinds thereof may be used in combination.

(SPD Type)

When the dimming laminate according to the present invention is of the SPD type, the dimming layer preferably includes a resin matrix and a light-modulating suspension dispersed in the resin matrix.

The light-modulating suspension includes a dispersion medium and light-modulating particles dispersed in the dispersion medium.

Examples of the light-modulating particles include carbon-based materials such as polyiodide and carbon black, metal materials such as copper, nickel, iron, cobalt, chromium, titanium, and aluminum, and inorganic compound materials such as silicon nitride, titanium nitride, and aluminum oxide. These materials may be particles coated with a polymer. One kind of the light-modulating particles may be used alone, and two or more kinds thereof may be used in combination.

The dispersion medium disperses the light-modulating particles in a flowable state. Preferably, the dispersion medium selectively adheres to the light-modulating particles to cover the light-modulating particles, and acts to cause the particles to be shifted to the phase-separated droplet phase at the time of phase separation from the resin matrix. The dispersion medium is preferably a material having no electrical conductivity, and is preferably a material having no affinity for the resin matrix. Furthermore, the dispersion medium is preferably a liquid copolymer having a refractive index approximate to that of the resin matrix when the dispersion medium is made into a dimming laminate. As the liquid copolymer, preferred is a (meth)acrylic acid ester oligomer having a fluoro group or a hydroxyl group, and more preferred is a (meth)acrylic acid ester oligomer having a fluoro group and a hydroxyl group. When such a copolymer is used, the monomer units of either the fluoro group or the hydroxyl group are faced toward the light-modulating particles, and the remaining monomer units stabilizes droplets of the light-modulating suspension in the resin matrix. Therefore, the light-modulating particles are easily dispersed in the light-modulating suspension, and at the time of the phase separation from the resin matrix, the light-modulating particles are easily introduced into the phase-separated droplets.

Examples of the (meth)acrylic acid ester oligomer having the fluoro group or the hydroxyl group include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, 1H,1H,2H,2H-heptadecafluorodecyl methacrylate/butyl acrylate/2-hydroxyethyl acrylate copolymer. These (meth)acrylic acid ester oligomers have each preferably both of the fluoro group and the hydroxyl group.

The weight average molecular weight of the (meth)acrylic ester oligomer is preferably 1000 or more, more preferably 2000 or more, and preferably 20000 or less, more preferably 10000 or less.

The weight average molecular weight means a weight average molecular weight in terms of polystyrene measured by gel permeation chromatography (GPC).

When the dimming material is of the SPD type, the dimming layer can be produced using a resin material for forming the resin matrix and the light-modulating suspension.

The resin material is preferably a resin material cured by irradiation with energy rays. Examples of the resin material cured by irradiation with energy rays include a polymeric composition containing a photopolymerization initiator, and a polymeric compound curable by an energy ray such as ultraviolet rays, visible rays or an electron ray. Examples of the polymeric composition include a polymeric composition containing a polymerizable monomer having an ethylenically unsaturated group and a photopolymerization initiator. Examples of the polymerizable monomer having an ethylenically unsaturated group include non-crosslinkable monomers and crosslinkable monomers.

Examples of the non-crosslinkable monomer include the non-crosslinkable monomers described above. Examples of the crosslinkable monomer include the crosslinkable monomers described above.

Examples of the photopolymerization initiator include 2,2-dimethoxy-1,2-diphenylethane-1-one, 1-(4-(2-hydroxyethoxy)phenyl)-2-hydroxy-2-methyl-1-propane-1-one, bis (2,4,6-trimethylbenzoyl)phenylphosphine oxide, 2-hydroxy-2-methyl-1-phenylpropan-1-one, and (1-hydroxycyclohexyl) phenyl ketone.

The resin material may contain an organic solvent soluble resin, a thermoplastic resin, poly(meth)acrylic acid, and the like. Furthermore, the resin material may contain various additives, such as a coloring inhibitor, antioxidant, and adhesiveness imparting agent, and may contain a solvent.
(First Transparent Base Material and Second Transparent Base Material)

The materials for the first transparent base material and the second transparent base material are not particularly limited. The material for the first transparent base material may be the same as or different from the material for the second transparent base material. Examples of the material for the transparent base material include glass and a resin film. Examples of the glass include soda-lime glass for general construction, lead glass, borosilicate glass, glass having various compositions in other applications, and functional glass such as heat reflection glass, heat absorption glass, and tempered glass. Examples of the resin film include polyester films such as polyethylene terephthalate, polyolefin films such as polypropylene, and resin films such as acrylic resin films. Since the transparency, formability, bondability, workability, and others are excellent, the transparent base material is preferably a resin base material, more preferably a resin film, further preferably a polyethylene terephthalate film.

The transparent base material preferably includes a base material body and a transparent conductive film formed on a surface of the base material body so that a voltage for dimming can be applied. Examples of the transparent conductive film include indium tin oxide (ITO), $SnO_2$, and $In_2O_3$.

From the viewpoint of further improving visibility of the dimming laminate, visible light transmittance of the first transparent base material and the second transparent base material is preferably 75% or more, more preferably 80% or more.

The visible light transmittance of the transparent base material can be measured by spectroscopic measurement or the like in accordance with ISO13837 (2008).

The present invention will be specifically described below by way of Examples and Comparative Examples. The present invention is not limited only to the following Examples.

Example 1

(1) Resin Spacer
Production of Resin Spacer 1:

To 1000 parts by weight of divinylbenzene (purity being 96%), 20 parts by weight of benzoyl peroxide were added and stirred until uniformly dissolved to obtain a monomer mixed solution. In a reaction kettle, 4000 parts by weight of a 2% by weight aqueous solution prepared by dissolving polyvinyl alcohol having a molecular weight of about 1700 in pure water were placed. The obtained monomer mixed solution was put therein and stirred for 4 hours to adjust the particle diameter so that monomer droplets would have a predetermined particle diameter. Thereafter, the reaction was carried out in a nitrogen atmosphere at 90° C. for 9 hours, and a polymerization reaction of monomer droplets was carried out to obtain particles. The obtained particles are washed several times with hot water, methanol and acetone, respectively, then classified and dried at 55° C. overnight, crushed, and passed through a stainless steel-mesh sieve to obtain a resin spacer 1 containing a plurality of resin particles. The average particle diameter of the resin spacer 1 was 15.9 μm.

(2) Dimming Laminate

Production of PDLC-Type Dimming Laminate 1:

A dimming film in which a known PDLC layer was disposed was produced except that 5% by weight of the resin spacer 1 was dispersed between two PET films on which transparent and conductive ITO was deposited. A dimming film 1 was sandwiched between two transparent glasses to produce a PDLC-type dimming laminate 1 (without curved surface).

Production of PDLC-Type Dimming Laminate 2:

A PDLC-type dimming laminate 2 (with curved surface (curved shape)) was produced by sandwiching the dimming film prepared from PDLC-type dimming laminate 1 between two 3 mm R transparent bent glass.

The PDLC-type dimming laminates 1 and 2 can be produced, for example, by a method described in JP 2013-148744 A etc.

Production of SPD-Type Dimming Laminate 1:

A dimming film in which a known SPD layer was disposed was produced except that 5% by weight of the resin spacer 1 was dispersed between two PET films on which transparent and conductive ITO was deposited. A dimming film was sandwiched between two transparent glasses to produce an SPD-type dimming laminate 1 (without curved surface).

Production of SPD-Type Dimming Laminate 2:

An SPD-type dimming laminate 2 (with curved surface (curved shape)) was produced by sandwiching the dimming film prepared from SPD-type dimming laminate 1 between two 3 mm R transparent bent glass.

The SPD-type dimming laminates 1 and 2 can be produced, for example, by a method described in JP 2014-089361 A etc.

Example 2

Production of Resin Spacer 2:

Carbon black whose surface was coated with a polymer was prepared. Mixing of 5 parts by weight of this carbon black, 47.5 parts by weight of divinylbenzene, and 47.5 parts by weight of tetramethylolmethane triacrylate was carried out to obtain a dispersion. To this dispersion, 20 parts by weight of benzoyl peroxide were added and mixed uniformly to obtain a mixed solution. The obtained mixed solution was put into 8500 parts by weight of a 3% by weight aqueous polyvinyl alcohol solution, sufficiently stirred, and then adjusted with a homogenizer so as to have a predetermined emulsified diameter.

This emulsion was transferred to a 20 liter reaction kettle equipped with a thermometer, stirrer, and reflux condenser, heated to 85° C. with stirred in a nitrogen atmosphere, and subjected to a polymerization reaction for 7 hours. The mixture was heated at 90° C. for 3 hours to conduct a polymerization reaction.

The resulting polymerization reaction liquid was cooled, and generated particles were washed with water, methanol, and acetone in this order and then classified. The classified particles were dried at 55° C. overnight, then crushed, and passed through a stainless steel-mesh sieve to obtain a resin spacer 2 containing a plurality of resin particles. The average particle diameter of the resin spacer 2 was 15.0 μm.

A dimming laminate was produced in the same manner as in Example 1, except that the resin spacer 2 was used instead of the resin spacer 1 when the dimming laminate was produced.

Example 3

Production of Resin Spacer 3:

A resin spacer 3 was obtained in the same manner as the resin spacer 2, except that the average particle diameter was 6.9 μm.

A laminate dimmer was produced in the same manner as in Example 1, except that the resin spacer 3 was used instead of the resin spacer 1 when the dimming laminate was produced.

Example 4

Production of Resin Spacer 4:

A resin spacer 4 was obtained in the same manner as the resin spacer 2, except that the average particle diameter was 30.2 μm.

A laminate dimmer was produced in the same manner as in Example 1, except that the resin spacer 4 was used instead of the resin spacer 1 when the dimming laminate was produced.

Example 5

Production of Resin Spacer 5:

A resin spacer 5 was obtained in the same manner as the resin spacer 1, except that the average particle diameter was 80.1 μm.

A laminate dimmer was produced in the same manner as in Example 1, except that the resin spacer 5 was used instead of the resin spacer 1 when the dimming laminate was produced. In Example 5, only the SPD-type dimming laminate was produced and evaluated.

Comparative Example 1

A dimming laminate was produced in the same manner as in Example 1, without a resin spacer when the dimming laminate was produced.

Comparative Example 2

Silica Spacer:

"Micropearl SI-H100" manufactured by Sekisui Chemical Co., Ltd. (average particle diameter: 10.0 μm)

A dimming laminate was produced in the same manner as in Example 1, except that a silica spacer was used instead of the resin spacer 1 when the dimming laminate was produced.

Comparative Example 3

Production of Resin Spacer A:

A resin spacer including a plurality of resin particles was produced in the same manner as in Example 1 except that the classification operation was not performed when the resin spacer was produced. An average particle diameter of a resin spacer A was 16.3 μm.

A dimming laminate was produced in the same manner as in Example 1, except that the resin spacer A was used instead of the resin spacer 1 when the dimming laminate was produced.

Comparative Example 4

Production of Resin Spacer B:

A resin spacer including a plurality of resin particles was produced in the same manner as in Example 2 except that the classification operation was not performed when the resin spacer was produced. An average particle diameter of a resin spacer B was 15.3 μm.

A dimming laminate was produced in the same manner as in Example 1, except that the resin spacer B was used instead of the resin spacer 1 when the dimming laminate was produced.

Comparative Example 5

Production of Resin Spacer C:

In the production of the resin spacer, 99% by weight of the resin spacer 2 and 1% by weight of the resin spacer B were mixed to prepare a resin spacer C including a plurality of resin particles. An average particle diameter of the resin spacer C was 15.1 μm.

A dimming laminate was produced in the same manner as in Example 1, except that the resin spacer C was used instead of the resin spacer 1 when the dimming laminate was produced.

(Evaluation)

(1) Average Particle Diameter

With respect to the obtained resin spacer, the particle diameter of about 100,000 resin particles was measured using a particle diameter distribution measuring device ("Multisizer 4" manufactured by Beckman Coulter, Inc.), and the average particle diameter was calculated.

(2) Existing State of Resin Spacer

With respect to the obtained resin spacer, the particle diameter of 1 million resin particles was measured using a particle diameter distribution measuring device ("Multisizer 4" manufactured by Beckman Coulter, Inc.).

From the measurement results of the average particle diameter of the resin particles obtained in (1) above, the number of resin particles having a particle diameter of 1.4 times or more the average particle diameter of the resin particles for 1 million resin particles and the number of resin particles having a particle diameter of 1.7 times or more the average particle diameter of the resin particles for 1 million resin particles were calculated.

With respect to the obtained resin spacer, the particle diameter of 1000 resin particles was measured using a particle diameter distribution measuring device ("Multisizer 4" manufactured by Beckman Coulter, Inc.).

From the measurement result of the average particle diameter of the resin particles obtained in (1) above, the number of resin particles having a particle diameter of 0.5 times or less the average particle diameter of the resin particles for 1000 resin particles was calculated.

(3) CV Value

The CV value of the particle diameter of the obtained resin particles was calculated by the method described above.

(4) 10% K Value and 20% K Value

The 10% K value and 20% K value of the obtained resin particles were measured by the above-described method using "Fischer Scope H-100" manufactured by FISCHER INSTRUMENTS K.K.

(5) Compression Recovery Rate

The compression recovery rate of the obtained resin particles was measured by the above-described method using "Fischer Scope H-100" manufactured by FISCHER INSTRUMENTS K.K.

(6) Strain to Failure

The strain to failure of the obtained resin particles was measured by the above-described method using "Fischer Scope H-100" manufactured by FISCHER INSTRUMENTS K.K.

(7) Total Light Ray Transmittance

The total light ray transmittance of the obtained resin particles was measured by the above-described method using "V-670" manufactured by JASCO Corporation.

(8) Surface Roughness (Surface Irregularities)

Roughness of the surface of the obtained dimming film was measured using a friction tester ("KES-SE" manufactured by Kato Tech Co., Ltd.). Specifically, an average friction coefficient and a fluctuation range of a friction coefficient obtained under the condition of a load of 25 gf were measured. It means that the higher these numerical values, the larger the surface roughness. The surface roughness was assessed according to the following criteria.

[Assessment Criteria for Surface Roughness]

o: Average friction coefficient was less than 0.20, and fluctuation range of friction coefficient was less than 0.015.

Δ: Average friction coefficient was 0.20 or more and less than 0.25, and fluctuation range of friction coefficient was 0.015 or more and less than 0.02.

ΔΔ: Surface roughness did not correspond to any of o, Δ and x.

x: Average friction coefficient was 0.25 or more, or fluctuation range of friction coefficient was 0.02 or more.

(9) Color Unevenness

For the obtained dimming laminate, whether or not color unevenness occurred was evaluated visually. Color unevenness was assessed according to the following criteria.

[Assessment Criteria for Color Unevenness]

o: No color unevenness occurred.

Δ: Slight color unevenness occurred (no problem in actual use).

x: Color unevenness occurred.

(10) Light Omission

For the obtained dimming laminate, whether or not light omission occurred was evaluated visually. The light omission was assessed according to the following criteria.

[Assessment Criteria for Light Omission]

o: No light omission occurred.

Δ: Slight light omission occurred (no problem in actual use).

x: Light omission occurred.

(11) Dimming Performance (Haze)

For the obtained dimming laminate, the haze in the case where a voltage was applied and the haze in the case where the voltage was not applied were calculated. The haze was measured using "Haze Meter TC-H3PDK" manufactured by Tokyo Denshoku Co., Ltd. The obtained haze was evaluated as the dimming performance of the dimming laminate. The dimming performance was assessed according to the following criteria.

[Assessment Criteria for Dimming Performance (Haze) (when No Voltage is Applied)]

o: Haze was 98% or more.

Δ: Haze was 95% or more and less than 98%.

x: Haze was less than 95%.

[Assessment Criteria for Dimming Performance (Haze) (when Voltage is Applied)]

○: Haze was less than 4%.

Δ: Haze was 4% or more and less than 6%.

x: Haze was 6% or more.

The results are shown in Tables 1 to 4 below.

TABLE 1

| | Evaluation | Example 1 | Example 2 | Example 3 | Example 4 | Example 5 |
|---|---|---|---|---|---|---|
| | (1) Average particle diameter (μm) | 15.9 | 15.0 | 6.9 | 30.2 | 80.1 |
| (2) Existing state of resin spacer | The number of resin particles having particle diameter of 1.4 times or more average particle diameter of resin particles per 1 million resin particles (particles) | 2 | 1 | 3 | 1 | 0 |
| | The number of resin particles having particle diameter of 1.7 times or more average particle diameter of resin particles per 1 million resin particles (particles) | 0 | 0 | 0 | 0 | 0 |
| | The number of resin particles having particle diameter of 0.5 times or less average particle diameter of resin particles per 1,000 resin particles (particles ) | 2 | 1 | 4 | 2 | 3 |
| | (3) CV value (%) | 4.8 | 4.0 | 4.3 | 3.9 | 4.1 |
| | (4) 10% K value (N/mm$^2$) | 3510 | 4350 | 4290 | 3560 | 3600 |
| | (4) 20% K value (N/mm$^2$) | 2950 | 4180 | 4260 | 3100 | 2870 |
| | (5) Compression recovery rate (%) | 62.1 | 83.0 | 87.4 | 79.3 | 51.8 |
| | (6) Strain to failure (%) | 53 | 36 | 30 | 38 | 55 |
| | (7) Total light ray transmittance (%) | 85.1 | 3.1 | 2.7 | 3.3 | 86.0 |
| | (8) Surface roughness (surface irregularities) | ○ | ○ | ○ | Δ | Δ |

TABLE 2

| | Evaluation | Example 1 | Example 2 | Example 3 | Example 4 | Example 5 |
|---|---|---|---|---|---|---|
| (9) Color unevenness | PDLC-type dimming laminate 1 (without curved surface) | ○ | ○ | ○ | ○ | — |
| | PDLC-type dimming laminate 2 (with curved surface) | ○ | ○ | ○ | Δ | — |
| | SPD-type dimming laminate 1 (without curved surface) | ○ | ○ | ○ | ○ | ○ |
| | SPD-type dimming laminate 2 (with curved surface) | ○ | ○ | ○ | Δ | Δ |
| (10) Light omission | PDLC-type dimming laminate 1 (without curved surface) | Δ | ○ | ○ | ○ | — |
| | PDLC-type dimming laminate 2 (with curved surface) | Δ | ○ | Δ | ○ | — |
| | SPD-type diming laminate 1 (without curved surface) | Δ | ○ | Δ | ○ | Δ |
| | SPD-type dimming laminate 2 (with curved surface) | Δ | ○ | Δ | ○ | Δ |
| (11) Dimming performance (haze) (when no voltage is applied) | PDLC-type dimming laminate 1 (without curved surface) | ○ | ○ | ○ | ○ | — |
| | PDLC-type dimming laminate 2 (with curved surface) | ○ | ○ | ○ | ○ | — |
| | SPD-type dimming laminate 1 (without curved surface) | ○ | ○ | ○ | ○ | ○ |
| | SPD-type dimming laminate 2 (with curved surface) | ○ | ○ | ○ | ○ | ○ |
| (11) Dimming performance (haze ) (when voltage is applied) | PDLC-type dimming laminate 1 (without curved surface) | ○ | ○ | ○ | Δ | — |
| | PDLC-type dimming laminate 2 (with curved surface) | ○ | ○ | ○ | Δ | — |
| | SPD-type dimming laminate 1 (without curved surface) | ○ | ○ | ○ | Δ | Δ |
| | SPD-type dimming laminate 2 (with curved surface) | ○ | ○ | ○ | Δ | Δ |

TABLE 3

| Evaluation | | Comparative Example 1 | Comparative Example 2 | Comparative Example 3 | Comparative Example 4 | Comparative Example 5 |
|---|---|---|---|---|---|---|
| (1) Average particle diameter (μm) | | — | 10.0 | 16.3 | 15.3 | 15.1 |
| (2) Existing state of resin spacer | The number of resin particles having particle diameter of 1.4 times or more average particle diameter of resion particles per 1 million resin pasticles (particles) | — | 0 | 100 or more | 100 or more | 9 |
| | The number of resin particles having particle diameter of 1.7 times or more average particle diameter of resin particles per 1 million resin particles (particles) | — | 0 | 100 or more | 100 or more | 1 |
| | The number of resin particles having particle diameter of 0.5 times or less average particle diameter of resin particles per 1,000 resin particles (particles) | — | 0 | 50 or more | 90 or more | 0 |
| (3) CV value (%) | | — | 1.0 | 27.4 | 30.1 | 4.2 |
| (4) 10% K value (N/mm$^2$) | | — | 49900 | 3530 | 4280 | 4300 |
| (4) 20% K value (N/mm$^2$) | | — | 50100 | 2990 | 4220 | 4200 |
| (5) Compression recovery rate (%) | | — | 72.7 | 63.8 | 84.5 | 83.3 |
| (6) Strain to failure (%) | | — | 36 | 53 | 36 | 36 |
| (7) Total light ray transmittance (%) | | — | 92.9 | 85.1 | 3.1 | 3.1 |
| (8) Surface roughness (surface irregularities) | | x | x | Δ | Δ | x |

TABLE 4

| Evaluation | | Comparative Example 1 | Comparative Example 2 | Comparative Example 3 | Comparative Example 4 | Comparative Example 5 |
|---|---|---|---|---|---|---|
| (9) Color unevenness | PDLC-type dimming laminate 1 (without curved surface) | x | ○ | x | x | x |
| | PDLC-type dimming laminate 2 (with curved surface) | x | ○ | x | x | Δ |
| | SPD-type dimming laminate 1 (without curved surface) | Δ | ○ | x | x | x |
| | SPD-type dimming laminate 2 (with curved surface) | x | ○ | x | x | Δ |
| (10) Light omission | PDLC-type dimming laminate 1 (without curved surface) | x | Δ | Δ | ○ | Δ |
| | PDLC-type dimming laminate 2 (with curved surface) | x | Δ | Δ | Δ | Δ |
| | SPD-type dimming laminate 1 (without curved surface) | Δ | Δ | Δ | ○ | Δ |
| | SPD-type dimming laminate 2 (with curved surface) | x | Δ | Δ | ○ | Δ |
| (11) Dimming performance (haze) (when no voltage is applied) | PDLC-type dimming laminate 1 (without curved surface) | x | Δ | Δ | Δ | ○ |
| | PDLC-type dimming laminate 2 (with curved surface) | x | x | Δ | Δ | ○ |
| | SPD-type dimming laminate 1 (without curved surface) | Δ | x | Δ | Δ | ○ |
| | SPD-type dimming laminate 2 (with curved surface) | x | x | Δ | Δ | ○ |
| (11) Dimming performance | PDLC-type dimming laminate 1 (without curved surface) | x | ○ | Δ | Δ | Δ |

TABLE 4-continued

| | Evaluation | Comparative Example 1 | Comparative Example 2 | Comparative Example 3 | Comparative Example 4 | Comparative Example 5 |
|---|---|---|---|---|---|---|
| (haze) (when voltage is applied) | PDLC-type dimming laminate 2 (with curved surface) | x | ○ | Δ | Δ | Δ |
| | SPD-type dimming laminate 1 (without curved surface) | x | ○ | Δ | Δ | Δ |
| | SPD-type dimming laminate 2 (with curved surface) | x | ○ | Δ | Δ | Δ |

EXPLANATION OF SYMBOLS

1: PDLC-type dimming laminate
2: First base material
3: Second base material
4,5: Dimming layer
4A: Liquid crystal capsule
4B: Binder
5A: Droplet of light-modulating suspension
5Aa: Dispersion medium
5Ab: light-modulating particles
5B: Resin matrix
6: Resin spacer
11: SPD-type dimming laminate

The invention claimed is:

1. A dimming laminate comprising:
a first transparent base material;
a second transparent base material; and
a dimming layer disposed between the first transparent base material and the second transparent base material,
the dimming layer comprising a resin spacer,
the resin spacer being a plurality of resin particles,
the 10% K value of the resin particles being 7000 N/mm$^2$ or less,
the resin spacer comprising no resin particles having a particle diameter of 1.4 times or more an average particle diameter of the resin particles or comprising 0.0006% or less of the resin particles having the particle diameter of 1.4 times or more the average particle diameter of the resin particles, relative to 100% of a whole number of the resin particles, and
the dimming laminate having a curved surface portion, a curvature of the curved surface portion of the dimming laminate being 30CR or more and 180CR or less.

2. The dimming laminate according to claim 1, wherein the resin spacer comprises no resin particles having a particle diameter of 1.7 times or more the average particle diameter of the resin particles.

3. The dimming laminate according to claim 1, wherein the resin spacer comprises no resin particles having a particle diameter of 0.5 times or less the average particle diameter of the resin particles or comprises 0.5% or less of the resin particles having the particle diameter of 0.5 times or less the average particle diameter of the resin particles, relative to 100% of the whole number of the resin particles.

4. The dimming laminate according to claim 1, wherein the average particle diameter of the resin particles is 3 μm or more and 100 μm or less.

5. The dimming laminate according to claim 1, wherein each of the resin particles comprises a pigment.

6. A resin spacer for a dimming laminate, the resin spacer being a plurality of resin particles,
the 10% K value of the resin particles being 7000 N/mm$^2$ or less,
the resin spacer comprising no resin particles having a particle diameter of 1.4 times or more an average particle diameter of the resin particles or comprising 0.0006% or less of the resin particles having the particle diameter of 1.4 times or more the average particle diameter of the resin particles, relative to 100% of a whole number of the resin particles, and
the dimming laminate having a curved surface portion, a curvature of the curved surface portion of the dimming laminate being 30CR or more and 180CR or less.

7. The resin spacer for a dimming laminate according to claim 6, comprising the resin particles, a number of which is 1 million or more.

\* \* \* \* \*